(12) United States Patent
Bhakar et al.

(10) Patent No.: US 9,521,171 B2
(45) Date of Patent: Dec. 13, 2016

(54) ACTION PROCESSING IN INFORMATION EXCHANGE SERVICES

(71) Applicant: Microsoft Corporation, Redmond, WA (US)

(72) Inventors: Gautam Bhakar, Redmond, WA (US); Sridhar Raman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 545 days.

(21) Appl. No.: 13/918,497

(22) Filed: Jun. 14, 2013

(65) Prior Publication Data

US 2014/0280572 A1    Sep. 18, 2014

Related U.S. Application Data

(60) Provisional application No. 61/778,869, filed on Mar. 13, 2013.

(51) Int. Cl.
*G06F 15/16*    (2006.01)
*H04L 29/06*    (2006.01)
*G06Q 10/10*    (2012.01)

(52) U.S. Cl.
CPC ............. *H04L 65/403* (2013.01); *G06Q 10/10* (2013.01); *G06Q 10/107* (2013.01); *G06Q 10/109* (2013.01)

(58) Field of Classification Search
CPC .................................. G06N 6/02; G06Q 40/00
USPC ........................................ 709/204, 223–224
See application file for complete search history.

(56) References Cited

U.S. PATENT DOCUMENTS

| | | | |
|---|---|---|---|
| 2005/0073606 A1* | 4/2005 | Haydock | 348/425.3 |
| 2007/0165815 A1* | 7/2007 | Shaffer et al. | 379/201.01 |
| 2009/0207995 A1* | 8/2009 | Wasmund | 379/242 |
| 2011/0047119 A1* | 2/2011 | Kaplan | 706/50 |
| 2013/0138745 A1* | 5/2013 | Tardelli et al. | 709/206 |

* cited by examiner

*Primary Examiner* — Philip B Tran
(74) *Attorney, Agent, or Firm* — Anand Gupta; Geraldine R. McMiller; Micky Minhas

(57) ABSTRACT

Provided herein are systems, methods, and software for facilitating information exchange services. In at least one implementation, an information exchange service processes communications indicative of a plurality of actions taken with respect to a plurality of derivative versions of a service item associated with a source version of the service item to determine which action of the plurality of actions controls. The information exchange service identifies a modification to apply to data associated with the source version of the service item to reflect the action determined to control and initiates communications indicative of the modification with which to update data associated with each of the plurality of derivative versions of the service item.

20 Claims, 6 Drawing Sheets

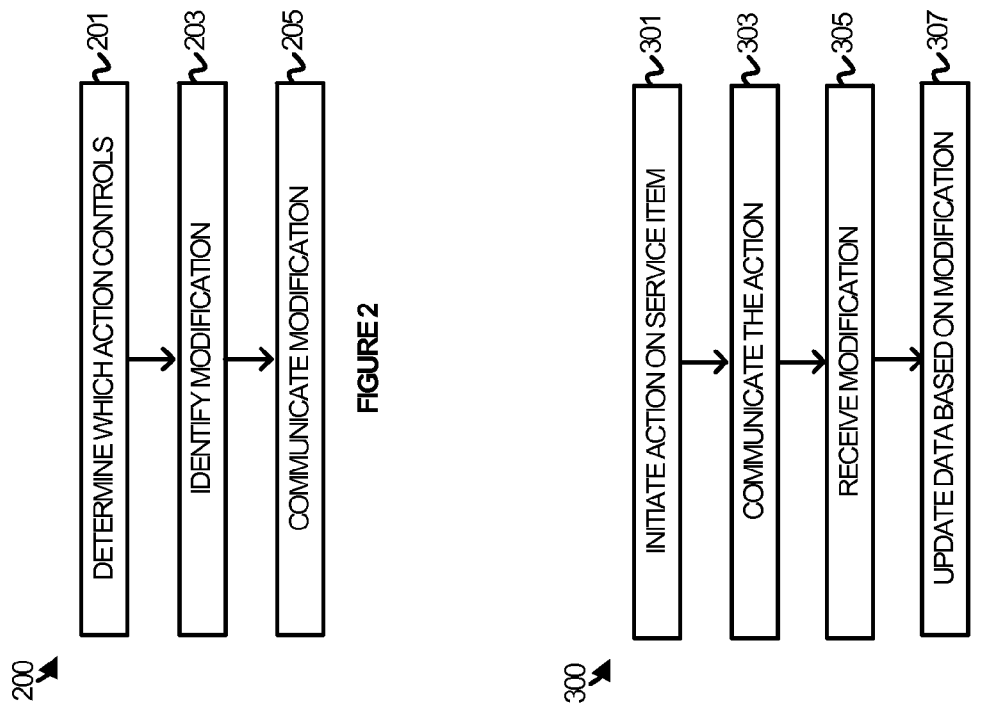
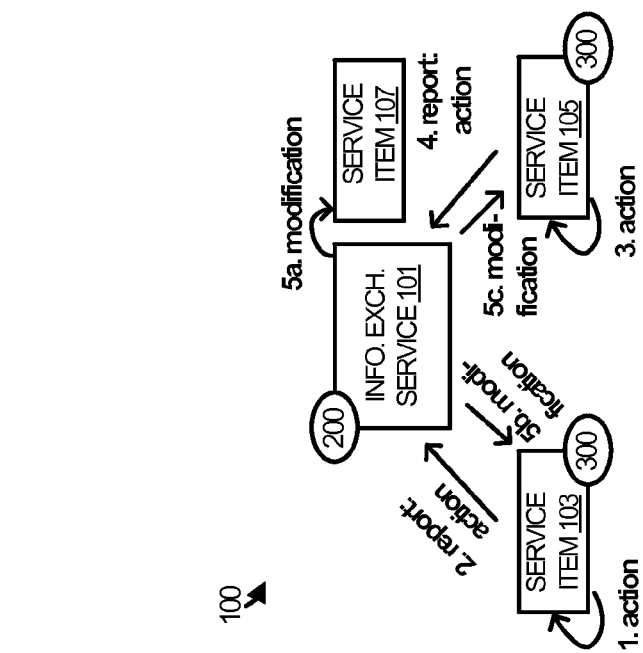

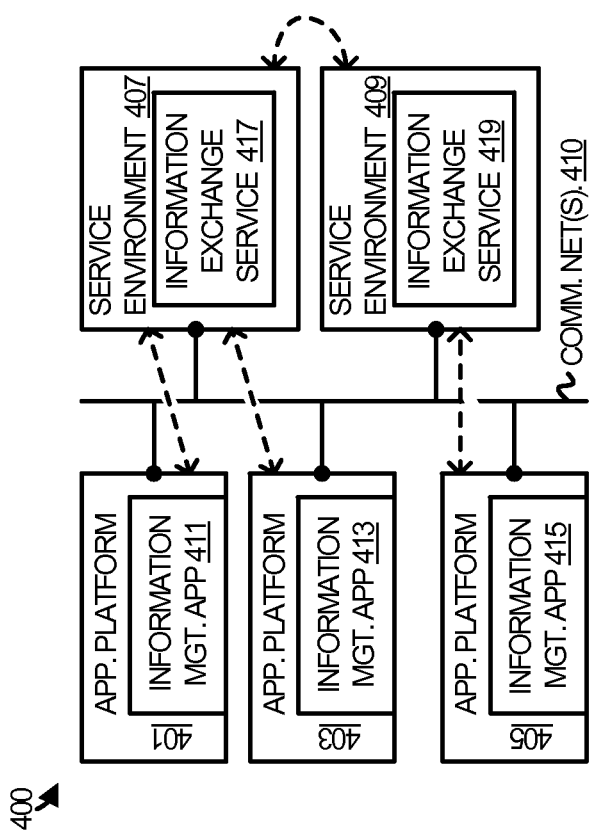

ACTION PROCESSING IN INFORMATION EXCHANGE SERVICES

RELATED APPLICATIONS

This application claims the benefit of and priority to U.S. Provisional Patent Application No. 61/778,869, filed on Mar. 13, 2013, and entitled "ACTION PROCESSING IN INFORMATION EXCHANGE SERVICES," which is hereby incorporated by reference in its entirety.

TECHNICAL FIELD

Aspects of the disclosure are related to computing hardware and software technology, and in particular to information management applications.

TECHNICAL BACKGROUND

Information management applications provide users with effective and convenient ways to communicate with others and manage their information. Examples of information management applications include but are not limited to email applications and calendar applications. Some information management applications integrate these various types of applications by way of modules, such as email, calendar, contact, and task modules, although each type of application or functionality may also be provided in a stand-alone manner. Microsoft® Outlook® is one example of an information management application.

While many information management applications are provided as locally installed and executed applications, many can be experienced in a wide variety of ways. For example, some information management applications are available as web-based applications that are experienced through a browser application, as mobile applications customized for mobile environments, or even as a mobile web-based application generally developed for a mobile browser experience. In addition, information management applications can be experienced on a wide variety of computing devices, such as desktop, laptop, or tablet computers, mobile phones, gaming systems, Internet appliances, or any other physical or virtual computing system, variation, or combination thereof.

Most information management applications communicate with application exchange services to facilitate various tasks, such as sending and receiving email, scheduling events, and the like. Many of these and other tasks implicate data that is synchronized. For example, when an action is taken in one environment, changes can be made to data that are then synchronized with other versions of the data.

In two specific examples, when a user deletes an email or dismisses an event reminder, data representative of the email or event reminder is changed, as are other versions of the data that may be accessed through other application environments. This may be the case not only with respect to the various ways in which a user may engage an information exchange service, but also with respect to multi-user situations. For example, multiple users may interact with a shared inbox. While the users may generally interact without causing conflicts, it is possible for an action of one user to conflict with an action taken by another user. In these and other scenarios, conflicts can lead to inconsistent experiences, data corruption, and possibly other problems arising from the conflicting actions.

OVERVIEW

Provided herein are systems, methods, and software for facilitating information exchange services. In at least one implementation, an information exchange service processes communications indicative of a plurality of actions taken with respect to a plurality of derivative versions of a service item associated with a source version of the service item to determine which action of the plurality of actions controls. The information exchange service identifies a modification to apply to data associated with the source version of the service item to reflect the action determined to control. The information exchange service then initiates communications indicative of the modification with which to update data associated with each of the plurality of derivative versions of the service item.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a service environment and an operational scenario in an implementation.

FIG. 2 illustrates an action process in an implementation.

FIG. 3 illustrates an action process in an implementation.

FIG. 4 illustrates a communication environment in an implementation.

TECHNICAL DISCLOSURE

Figure 5:
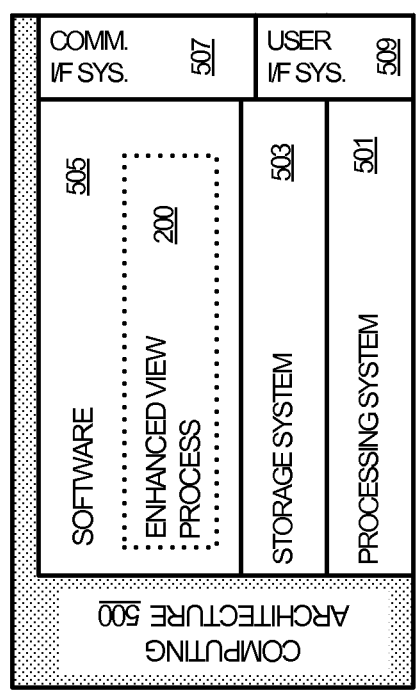
FIG. 5 illustrates a computing architecture in an implementation.

Implementations disclosed herein enable improved data consistency in information management applications. Actions taken with respect to various derivative versions of a service item are reported to an information exchange service. The information exchange service determines what modification or modifications should be made to a source version of the service item in view of the various actions. The information exchange service makes the modification to the source version and communicates the modification so that data associated with the derivative versions of the service item may be updated.

In at least one implementation, an information management service processes action communications indicative of various actions taken with respect to various derivative versions of a service item associated with a source version of the service item to determine which action of the various actions controls. The information management service identifies a modification to apply to source data associated with the source version of the service item to reflect the action determined to control, and initiates update communications indicative of the modification with which to update derivative data associated with each of the various derivative versions of the service item.

In at least some implementations, the action communications include a first action communication initiated by a first client running a first information management application and a second action communication initiated by a second client running a second information management application. The first action communication indicates a first action taken by the first client with respect to a first derivative version of the service item, while the second action communication indicates a second action taken by the second client with respect to a second derivative version of the service item.

The update communications may include a first update communication indicative of the modification with which to update the derivative data associated with the first derivative version of the service item and a second update communication indicative of the modification with which to update the derivative data associated with the second derivative version of the service item.

In some implementations, the modification with which to update the derivative data is the same for both the first derivative version and the second derivative version of the various derivative versions of the service item. Examples of the service item include, but are not limited to, an email, a calendar event, a contact, and a task.

In a scenario where the service item is an email, the various actions taken with respect to the various derivative versions of the service item may be, for example, a move action and a delete action and the modification may be the move action or the delete action. In a scenario where the service item is a calendar event, the various actions taken with respect to the various derivative versions of the service item may be, for example, a cancel action and a reminder action and the modification may be the cancel action or the reminder action.

In one implementation, an information management application running on a suitable application platform initiates an action with respect to one of various local versions of a service item associated with a source version of the service item. The information management application transfers an action communication indicative of the action to an information exchange service that maintains the source version of the service item. Responsive to the action communication, the information management application receives an update communication indicative of a modification with which to update local data associated with the one of the various local versions of the service item and updates the local data in accordance with the modification.

In some scenarios the modification may correspond to a second action initiated with respect to a second one of the various local versions of the service item that conflicts with the action initiated with respect to the one of the various local versions. For example, the service item may be an email and the action may include deleting the email. In addition, the second action may include moving the email. To update the local data in accordance with the modification, the information management application may be directed to move the email to a different folder rather than delete the email.

In another example, the service item may be a calendar event, the action may include canceling the calendar event, and the second action may include scheduling a reminder for the calendar event. To update the local data in accordance with the modification, the information management application may be directed to schedule the reminder for the event. In yet another example, the service item may be a contact and updating the local data may include changing the contact.

In a brief operational example, two different users may share access to an email account hosted by an email service. Each user may have access rights such that they can initiate actions with respect to the emails in an inbox and other folders, such as deleting, moving, forwarding, and replying to emails, as well as performing any other action. Each user may interact with the email service by way of an email application running on a suitable application platform, such a desktop, laptop, or tablet computer, a mobile phone, personal digital assistant, Internet appliance, or any other type of platform.

In operation, each of the users interacts with graphical objects, menus, and other elements in a user interface to the email application. It may be appreciated that the email application could be a stand-alone application or may include other features or functionality, such as calendar, contacts, and tasks modules. Local versions of each email in the shared email account are stored locally with respect to each user, while a source version of each email is maintained remotely by the email service.

As the users interact with each respective instance of the email application, the actions taken with respect to the emails are communicated by the email application to the email service running remotely in a service environment. Rather than update the source version of each email in view of the actions taken locally by a user, the email service first analyzes each action in view of other actions taken by another user or users with respect to the same email to determine which action controls. The email service decides what modification to make to the source version of the email and then communicates the modification to each email application running locally with respect to the users. In this manner, conflicts that may arise when both users take inconsistent actions with respect to each other can be mitigated.

In one exemplary scenario, a first user operating a first computing system may interact with a user interface to a first client application to delete an email in a shared inbox. Before, after, or at substantially the same time as the first user, a second user operating a second computing system may interact with a user interface to a second client application to move the same email in the shared inbox to a different folder. In other words, the second user initiates an action that is in conflict with or is inconsistent with another action.

Rather than implement the delete and move actions or operations locally and then update the email service, each client application first reports the action that occurred. The email service can consider various rules and criteria to determine how to modify a source version of the email maintained by the email service. For example, the email service may consider the identity of each user, a role associated with each user, an order in which the actions occurred, or any other factor that may be relevant.

In this scenario, the email service may determine to either implement the delete action or implement the move action and modifies a source version of the email accordingly. The email service then communicates the modification to each client application such that each client application can modify a local version of the email to be synchronized with the source version. Assuming the delete action is given priority, the email service would delete the source version of the email and communicate the deletion to the client applications. Each client application would then delete their respective local version of the email. Assuming the mail action is given priority, the email service would move the source version of the email to a different folder and communicate the move to the client applications. Each client application would then move their respective local version of the email.

Referring now to the drawings, FIG. 1 illustrates one operational scenario involving a service environment 100 in an implementation. Service environment 100 includes information exchange service 101. Information exchange service 101 may communicate with various information management applications (not shown) to facilitate various services, such as email, calendaring, and contacts services. As part of the various services, information exchange service 101 maintains a source version of a service item, service item 107. Derivative versions of the source service item exist in other environments, such as service item 103 and service item 105. As actions are taken with respect to the derivative versions of the service items, information exchange service 101 determines what modifications to make to data associated with service item 107, such as a mailbox or other suitable data structure. Those modifications can be communicated such that updates can be implemented with respect to data associated with the other service items, service item 103 and service item 105.

FIG. 2 illustrates an action process 200 that may be implemented by information exchange service 101. In operation, information exchange service 101 receives communications initiated by various clients running information management applications. The communications are indicative of actions taken with respect to derivative versions of service items associated with a source version maintained by the service.

Information exchange service 101 determines which action of the various actions controls (step 201). In other words, information exchange service 101 analyzes various factors or characteristics of each action against rules and other criteria to determine which action should control or be applied, assuming the actions are in conflict. For example, one action may represent that a reminder should be associated and started with respect to a calendar event, while another action may indicate that the event should be deleted. Since these two actions conflict, information exchange service 101 analyzes their various characteristics and other considerations to determine which action controls.

After determining which action controls, information exchange service 101 identifies a modification to make to data associated with the source item (step 203). For example, if a snooze action controls, relative to a delete action, data associated with the source item may be updated to reflect this state. In another example, various move actions may conflict with each other when more than one attempt is made to move a mail item to a new folder. Assuming it is resolved which action controls, data associated with the source version of the mail item can be updated to reflect its new position in a folder.

Having identified and possibly implemented the modification with respect to the source version of the service item, information exchange service 101 communicates the modification such that derivative versions of the service item may be updated accordingly (step 205). For example, various clients running various instances of an information management application can update local versions of the service items in accordance with the modification made with respect to the source version of the service item.

FIG. 300 illustrates another action process 300 which may be implemented by an information management application. In operation, an action is initiated on a service item (step 301). For example, an email may be moved, a calendar event may be canceled or deleted, a task may be completed, or a contact may be changed. The information management application communicates the action or a description thereof to information exchange service 101 (step 303). As discussed with respect to FIG. 2, the information exchange service 101 identifies an appropriate modification and communicates the modification to the information management application. The information management application receives the modification (step 305) and updates data associated with the service item accordingly (step 307).

FIG. 4 illustrates a communication environment 400 in which various information exchange services may implement action process 200 and in which various information management applications may implement action process 300. Communication environment 400 includes application platform 401, application platform 403, and application platform 405. Application platform 401 and application platform 403 may communicate with service environment 407 to access information exchange service 417 on behalf of information management application 411 and information management application 413 respectively. Application platform 405 may communicate with service environment 409 to access information exchange service 419 on behalf of information management application 415. From time to time, service environment 407 and service environment 409 may communicate in furtherance of interaction between information exchange service 417 and information exchange service 419

Examples of application platforms 401, 403, and 405, include, but are not limited to, desktop computers, work stations, laptop computers, notebook computers, tablet computers, mobile phones, personal digital assistances, media devices, gaming devices, and any other physical or virtual computing machine or combinations and variations thereof capable of implementing at least one of a variety of information management applications. Service environment 407 may be any computing system or collection of computing systems capable of implementing an information exchange service 417.

Application platforms 401, 403, and 405 may each be any computing apparatus, system, device, or collections thereof that employ a computing architecture suitable for implementing information management application 411, 413, or 415 respectively. Computing architecture 500 referred to with respect to FIG. 5 is one such representative architecture. Information management applications 411, 413, and 415 may each be any version or variety of an information management application. Examples include but are not limited to locally installed and executed applications, streaming applications, web-based applications that execute at least in part within the context of a browser application, mobile applications, mobile web-based applications that execute at least in part within the context of a mobile browser application, or any other application type, variation, or combination thereof.

Information management applications 411, 413, and 415 may each be embodied in program instructions that, when executed by application platforms 401, 403, and 405 respectively direct each to operate as described herein for action process 300 discussed with respect to FIG. 3. The program instructions may take the form of compiled object code, interpreted scripts, or any other suitable form of program instructions that may be executed directly or indirectly by an application platform, as well as any suitable variation or combination thereof. Examples of information management applications include but are not limited to Microsoft® Outlook®, Mozilla Thunderbird/Lightening, Open Xchange, Microsoft® Outlook® Web App, Microsoft® Outlook® Web App for mobile device, Outlook.com®, Gmail, and Microsoft® Outlook® for mobile devices, as well as another suitable information management application, variation, or combination thereof.

Service environment 407 and service environment 409 may each include any computing apparatus, system, device, or collections thereof that employ a computing architecture suitable for implementing information exchange service 417 and information exchange service 419 respectively. Computing architecture 500 referred to with respect to FIG. 5 is one such representative architecture. Examples include server computers, cloud computing platforms, data centers, and any physical or virtual computing machine, as well as any variation or combination thereof. Examples of information exchange service 417 and information exchange service 419 include but are not limited to Microsoft® Exchange®, Microsoft® O365®, Hotmail®, Outlook.com®, and Gmail, as well as any other information exchange service, combination, or variation thereof capable of operating as described herein.

In operation, any of applications platforms 401, 403, and 405 may communicate from time to time with service environment 407 or service environment 409 over communication network 410 to facilitate the exchange of information between information management applications 411 and 413 and information exchange service 417 and between information management application 415 and information exchange service 419. Service environment 407 and service environment 409 may also communicate over communication network 410 to facilitate the exchange of information.

Communication between any of the elements contemplated in FIG. 4 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 410 may be representative of a network or collection of networks over which the elements contemplated in FIG. 4 may exchange information, such as an intranet, the Internet, a local area network, a wide area network, a wireless network, a wired network, or any combination or variation thereof. Communication network 410 may include connections, devices, and communication media, such as metal, glass, air, or any other suitable communication media over which information may be exchanged. The aforementioned communication media, network, connections, protocols, and devices are well known and need not be discussed at length here.

The manner and format in which information is exchanged may vary. In some implementations, an application may exchange information with a service environment and information exchange service in accordance with various protocols, such as IMAP (internet message access protocol), POP (post office protocol), SMTP (simple mail transfer protocol), OWA (Outlook Web App) webmail protocol, various other webmail protocols, various proprietary protocols, HTTP (hypertext transfer protocol), REST (representational state transfer), WebSocket, DOM (Document Object Model), HTML (hypertext markup language), CSS (cascading style sheets), HTML5, XML (extensible markup language), Javascript, JSON (Javascript Object Notation), and AJAX (Asynchronous Javascript and XML), as well as any other suitable protocol, variation, or combination thereof.

Referring now to FIG. 5, computing architecture 500 is representative of an architecture that may be employed in any apparatus, system, or device, or collections thereof, to suitably implement all or portions of action process 200 illustrated in FIG. 2 or variations thereof, or action process 300 illustrated in FIG. 3 or variations thereof, and optionally all or portions of the information management application referred to with respect to FIG. 1. Action process 200 or 300 may be implemented on a single apparatus, system, or device or may be implemented in a distributed manner. The information management application may also be implemented on a single apparatus, system, or device or may be implemented in a distributed manner. Action process 300 may be integrated with the information management application, but may also stand alone or be embodied in some other application.

Computing architecture 500 may be employed in, for example, desktop computers, laptop computers, tablet computers, notebook computers, mobile computing devices, cell phones, media devices, and gaming devices, as well as any other type of physical or virtual computing machine and any combination or variation thereof. Computing architecture 500 may also be employed in, for example, server computers, cloud computing platforms, data centers, any physical or virtual computing machine, and any variation or combination thereof.

Computing architecture 500 includes processing system 501, storage system 503, software 505, communication interface system 507, and user interface system 509. Processing system 501 is operatively coupled with storage system 503, communication interface system 507, and user interface system 509. Processing system 501 loads and executes software 505 from storage system 503. When executed by processing system 501, software 505 directs processing system 501 to operate as described herein for action process 200 or 300 or their variations. Computing architecture 500 may optionally include additional devices, features, or functionality not discussed here for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variation.

Storage system 503 may comprise any computer readable storage media readable by processing system 501 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 503 may also include communication media over which software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 501 or possibly other systems.

Software 505 may be implemented in program instructions and among other functions may, when executed by processing system 501, direct processing system 501 to operate as described herein for action process 200 or 300. In particular, the program instructions may include various components or modules that cooperate or otherwise interact to carry out action process 200 or 300. The various components or modules may be embodied in compiled or interpreted instructions or in some other variation or combination of instructions. The various components or modules may be executed in a synchronous or asynchronous manner, in a serial manner or in parallel, in a single threaded environment or multi-threaded, or in accordance with any other suitable execution paradigm, variation, or combination thereof. Software 505 may include additional processes, programs, or components, such as operating system software or other application software. Software 505 may also comprise firmware or some other form of machine-readable processing instructions executable by processing system 501.

In general, software 505 may, when loaded into processing system 501 and executed, transform a suitable apparatus, system, or device employing computing architecture 500 overall from a general-purpose computing system into a special-purpose computing system customized to facilitate data synchronization as described herein for each implementation. Indeed, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage, as well as other factors.

For example, if the computer-storage media are implemented as semiconductor-based memory, software 505 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing architecture 500 is generally intended to represent an architecture on which software 505 may be deployed and executed in order to implement action process 200 or 300 (or variations thereof) and optionally all or portions of an information management application. However, computing architecture 500 may also be suitable for any computing system on which software 505 may be staged and from where software 505 may be distributed, transported, downloaded, or otherwise provided to yet another computing system for deployment and execution, or yet additional distribution.

Communication interface system 507 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 509 is optional and may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here. User interface system 509 may also include associated user interface software executable by processing system 501 in support of the various user input and output devices discussed above. Separately or in conjunction with each other and other hardware and software elements, the user interface software and devices may support a graphical user interface, a natural user interface, or any other suitable user interface.

Figure 6:
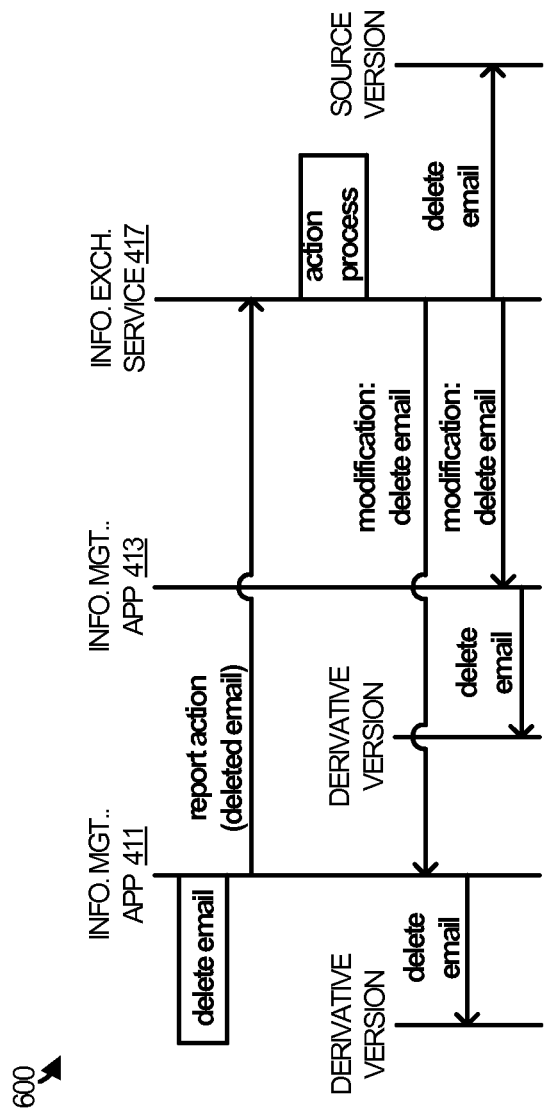
FIG. 6 illustrates an operational scenario in an implementation.

FIG. 6 illustrates an operational scenario 600 in which action process 200 and action process 300 are employed. In operation, a user interacting with information management application 411 initiates an action to delete an email. Information management application 411 reports the delete action to information exchange service 417. Information exchange service 417 considers the reported action in view of any other reported actions to determine which one controls. In operational scenario 600, the delete action is the only reported action and so it controls. Accordingly, information exchange service 417 modifies a source version of the email by deleting it.

Information exchange service 417 also communicates the modification to information management application 411 and information management application 413. Information management application 411 deletes its respective derivative version of the email. Information management application 413 also deletes its respective derivative version of the email. In this manner, the various derivative versions of the service item are synchronized with the source version of the service item.

Figure 7:
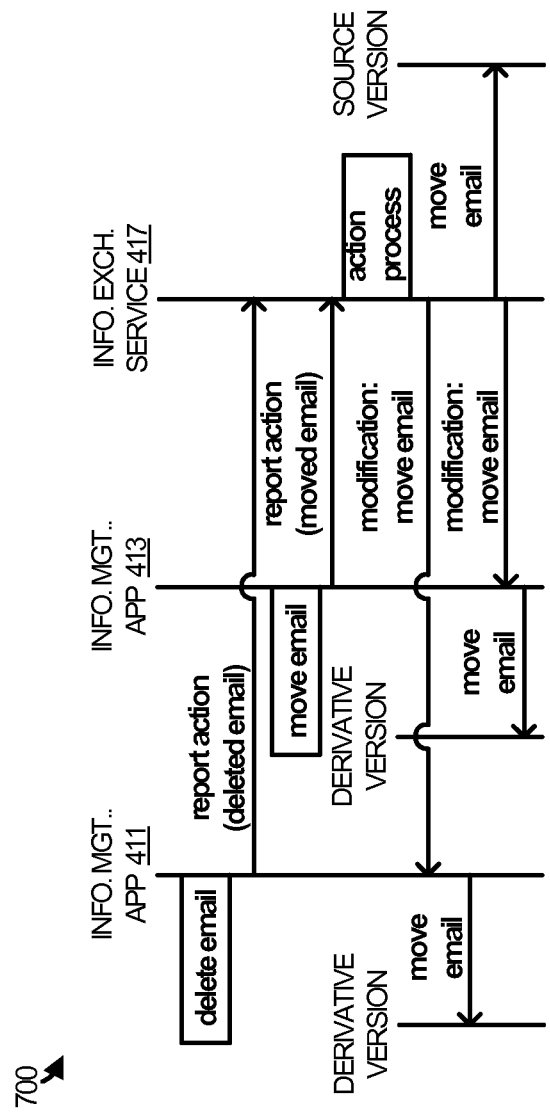
FIG. 7 illustrates an operational scenario in an implementation.

FIG. 7 illustrates another operational scenario 700 in which action process 200 and action process 300 are employed. In operation, a user interacting with information management application 411 initiates an action to delete an email. Information management application 411 reports the delete action to information exchange service 417. In addition, another user interacting with information management application 413 initiates an action to move the same email. Information management application 413 responsively reports the move action to information exchange service 417.

Information exchange service 417 considers the reported actions in view of each other and weighs them against various rules and criteria to determine which one controls. In operational scenario 700, it is assumed for exemplary purposes that the move action controls. Accordingly, information exchange service 417 modifies a source version of the email by moving it to a different folder. Information exchange service 417 also communicates the modification to information management application 411 and information management application 413. Responsive to the communication from information exchange service 417, information management application 411 moves its respective derivative version of the email and information management application 413 moves its respective derivative version of the email, thereby synchronizing their data.

Figure 8:
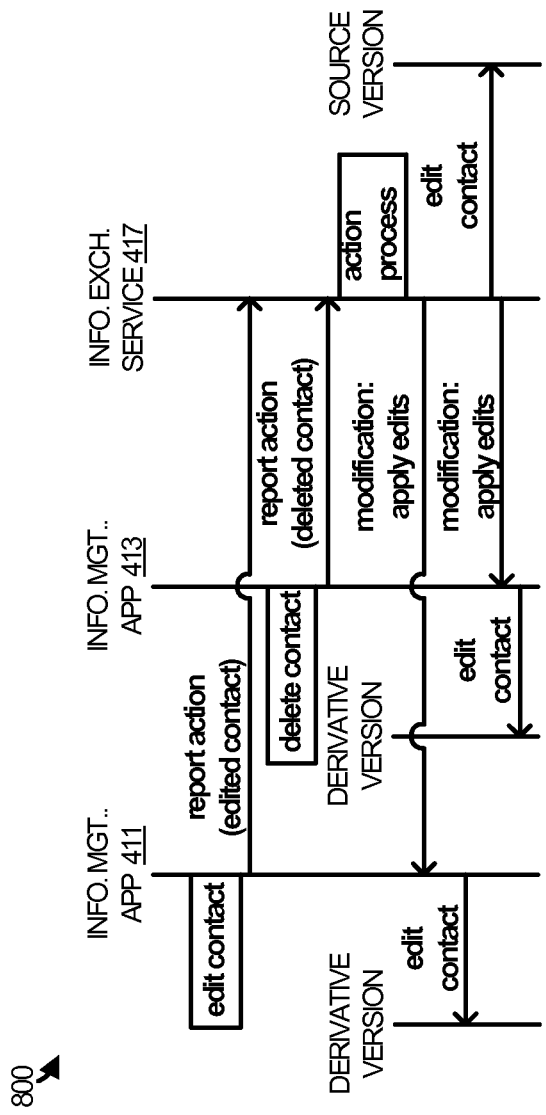
FIG. 8 illustrates an operational scenario in an implementation.

FIG. 8 illustrates yet another operational scenario 800 in which action process 200 and action process 300 are employed. In operation, a user interacting with information management application 411 initiates an action to edit a contact. Information management application 411 reports the edit action to information exchange service 417. In addition, another user interacting with information management application 413 initiates an action to delete the contact. Information management application 413 responsively reports the delete action to information exchange service 417.

Information exchange service 417 considers the reported actions in view of each other and weighs them against various rules and criteria to determine which one controls. In operational scenario 800, it is assumed for exemplary purposes that the edit action controls. Accordingly, information exchange service 417 edits a source version of the contact. Information exchange service 417 also communicates the modification to information management application 411 and information management application 413. Responsive to the communication from information exchange service 417, information management application 411 edits its respective derivative version of the contact and information management application 413 edits its respective derivative version of the contact such that the derivative and source versions of the contact are synchronized.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for facilitating at least a portion of an information exchange service that, when executed by a processing system, direct the processing system to at least:
    process action communications indicative of a plurality of actions taken with respect to a plurality of derivative versions of a service item associated with a source version of the service item;
    when a first action of the plurality of actions is in conflict with a second action of the plurality of actions, determine which action of the first action and the second action controls in view of the conflict;
    identify a modification to apply to source data associated with the source version of the service item to reflect the action determined to control; and
    initiate update communications indicative of the modification with which to update derivative data associated with each of the plurality of derivative versions of the service item.

2. The one or more computer readable storage media of claim 1 wherein the action communications comprise a first action communication initiated by a first client running a first information management application and a second action communication initiated by a second client running a second information management application.

3. The one or more computer readable storage media of claim 2 wherein the first action communication indicates a first action of the plurality of actions taken by the first client with respect to a first derivative version of the plurality of derivative versions of the service item, and wherein the second action communication indicates a second action of the plurality of actions taken by the second client with respect to a second derivative version of the plurality of derivative versions of the service item.

4. The one or more computer readable storage media of claim 3 wherein the update communications comprise a first update communication indicative of the modification with which to update the derivative data associated with a first derivative version of the plurality of derivative versions of the service item associated with the first client, and wherein the update communications comprise a second update communication indicative of the modification with which to update the derivative data associated with a second derivative version of the plurality of derivative versions of the service item associated with the second client.

5. The one or more computer readable storage media of claim 4 wherein the modification with which to update the derivative data is the same for both the first derivative version and the second derivative version of the plurality of derivative versions of the service item.

6. The one or more computer readable storage media of claim 5 wherein the service item comprises an email, wherein the plurality of actions taken with respect to the plurality of derivative versions of the service item comprises a move action and a delete action, and wherein the modification comprises the move action or the delete action.

7. The one or more computer readable storage media of claim 5 wherein the service item comprises a calendar event, wherein the plurality of actions taken with respect to the plurality of derivative versions of the service item comprises a reminder action and a delete action, and wherein the modification comprises the reminder action or the delete action.

8. A computing apparatus comprising:
    one or more computer readable storage media; and, an information management application comprising program instructions stored on the one or more computer readable media that, when executed by a processing system, direct the processing system to at least:
- initiate an action with respect to one of a plurality of local versions of a service item associated with a source version of the service item;
- transfer an action communication indicative of the action to an information exchange service that maintains the source version of the service item and determines a modification to make to the source version of the service item based on the action initiated with respect to one of the plurality of local versions of the service item;
- responsive to the action communication, receive an update communication indicative of the modification with which to update local data associated with the one of the plurality of local versions of the service item; and
- update the local data in accordance with the modification.

9. The computing apparatus of claim 8 wherein the modification corresponds to a second action initiated with respect to a second one of the plurality of local versions of the service item that conflicts with the action initiated with respect to the one of the plurality of local versions of the service item.

10. The computing apparatus of claim 9 wherein the service item comprises an email, wherein the action comprises deleting the email, wherein the second action comprises moving the email, and wherein to update the local data in accordance with the modification, the program instructions direct the processing system to move the email to a different folder rather than delete the email.

11. The computing apparatus of claim 9 wherein the service item comprises a calendar event, wherein the action comprises canceling the calendar event, wherein the second action comprises scheduling a reminder for the calendar event, and wherein to update the local data in accordance with the modification, the program instructions direct the processing system to schedule the reminder for the event.

12. The computing apparatus of claim 9 wherein the service item comprises a contact wherein to update the local data in accordance with the modification, the program instructions direct the processing system to change the contact.

13. The computing apparatus of claim 9 further comprising the processing system configured to execute the program instructions and wherein the service item comprises one of at least an email, a calendar event, a contact, and a task.

14. A method for operating an information exchange service comprising:
- processing action communications indicative of a plurality of actions taken with respect to a plurality of derivative versions of a service item associated with a source version of the service item;
- when a first action of the plurality of actions is in conflict with a second action of the plurality of actions, determining which action of the first action and the second action controls in view of the conflict;
- identifying a modification to apply to source data associated with the source version of the service item to reflect the action determined to control; and
- initiating update communications indicative of the modification with which to update derivative data associated with each of the plurality of derivative versions of the service item.

15. The method of claim 14 wherein the action communications comprise a first action communication initiated by a first client running a first information management application and a second action communication initiated by a second client running a second information management application.

16. The method of claim 15 wherein the first action communication indicates a first action of the plurality of actions taken by the first client with respect to a first derivative version of the plurality of derivative versions of the service item, and wherein the second action communication indicates a second action of the plurality of actions taken by the second client with respect to a second derivative version of the plurality of derivative versions of the service item.

17. The method of claim 16 wherein the update communications comprise a first update communication indicative of the modification with which to update the derivative data associated with a first derivative version of the plurality of derivative versions of the service item associated with the first client, and wherein the update communications comprise a second update communication indicative of the modification with which to update the derivative data associated with a second derivative version of the plurality of derivative versions of the service item associated with the second client.

18. The method of claim 17 wherein the modification with which to update the derivative data is the same for both the first derivative version and the second derivative version of the plurality of derivative versions of the service item.

19. The method of claim 18 wherein the service item comprises an email, wherein the plurality of actions taken with respect to the plurality of derivative versions of the service item comprises a move action and a delete action, and wherein the modification comprises the move action or the delete action.

20. The method of claim 18 wherein the service item comprises a calendar event, wherein the plurality of actions taken with respect to the plurality of derivative versions of the service item comprises a reminder action and a delete action, and wherein the modification comprises the reminder action or the delete action.

* * * * *